Aug. 29, 1933.  H. H. HOUSE  1,924,498
FLUSH OUT FITTING
Filed Jan. 6, 1932
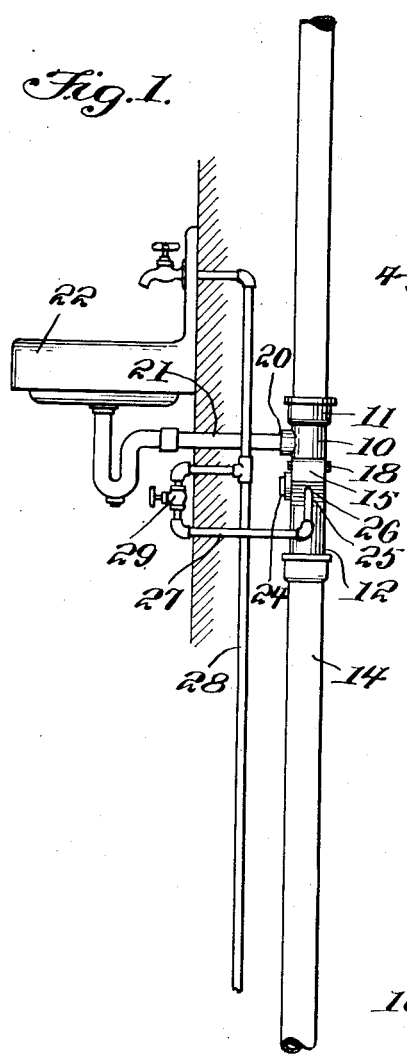
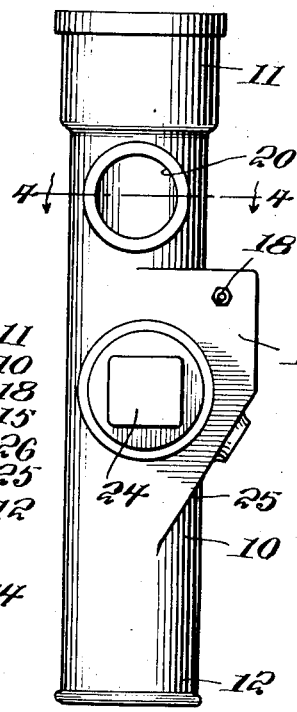
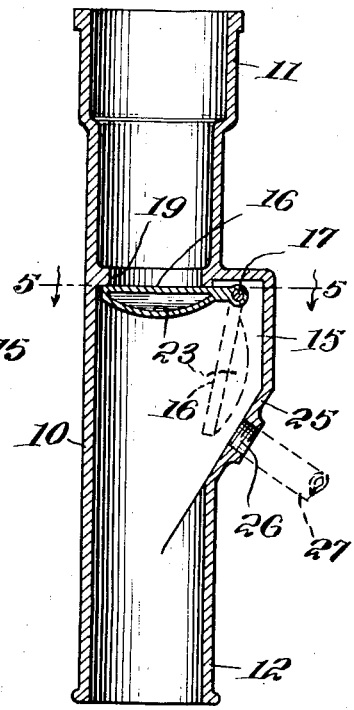
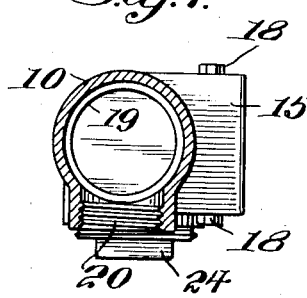
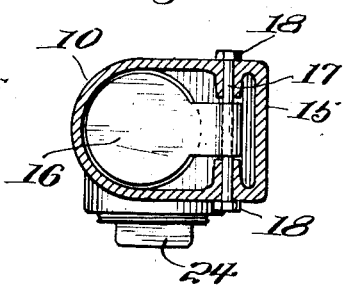
Hiram Hammond House
INVENTOR
BY Victor J. Evans & Co.
ATTORNEY
WITNESS J. L. Wright Patented Aug. 29, 1933

1,924,498

UNITED STATES PATENT OFFICE 1,924,498

FLUSH OUT FITTING

Hiram Hammond House, El Paso, Tex.

Application January 6, 1932. Serial No. 585,121

2 Claims. (Cl. 182—22)

The object of the invention is to provide a fitting for use in conjunction with plumbing fixtures as an element of the waste pipe, so that any stoppage in the latter may be dislodged and transferred to the sewer by the diversion of the pressure from the service line into the waste pipe; to provide a fitting including a gate valve which will be automatically moved to closed position in the event of stoppage in the waste pipe; and generally to provide a device of the kind indicated which is of simple form, susceptible of cheap manufacture and of a character that may be readily installed.

With this object in view, the invention consists in a construction and combination of parts of which a preferred embodiment is illustrated in the accompanying drawing but to which embodiment the invention is not to be restricted further than the limitations prescribed by the appended claims.

In the drawing:

Figure 1 is an elevational view showing the invention applied in operative connection with a sink.

Figure 2 is an enlarged elevational view showing the fitting detached.

Figure 3 is a central vertical sectional view.

Figure 4 is a transverse sectional view on the plane indicated by the line 4—4 of Figure 2.

Figure 5 is a transverse sectional view on the plane indicated by the line 5—5 of Figure 3.

While the invention may be constructed for use with either wrought or galvanized iron pipe, in which case it will be threaded at its opposite ends to act as a coupling member for pipe sections, it may also be constructed as a cast iron fitting in which case the tubular body 10 will be formed with a conventional bell 11 at one end and hub 12 at the other end, so that it may be calked to the pipe sections constituting the waste line 14, indicated in Figure 1 of the drawing. At an intermediate point in its length, the tubular body is formed with a chambered lateral enlargement 15 in which is received a gate or flap valve 16 swingingly mounted on a hinge rod 17 extending through opposite walls of the enlargement 15 and receiving exteriorly thereof the nuts 18 by which the hinge rod may be held in place. By being mounted in the enlargement, the gate or flap valve is susceptible of two positions, one wholly within the chambered enlargement where it is in unobstructing relation to the waste line and the other in engagement with the seat 19, where it closes the waste pipe below the inlet 20 which is formed by an internally threaded lateral leg to which the waste connection 21 of the sink 22, or other plumbing fixture, may be connected.

The gate valve 16 may or may not be provided with a water-tight air chamber 23, but if provided with the latter, as indicated in the drawing, this air chamber acts as a float, so that in the event of stoppage in the waste pipe below the fixture inlet, the accumulation of water on top of the stoppage will result in raising the flap valve to closed position in engagement with the seat 19.

A clean out opening is provided in the body 10 and closed with a removable plug 24, this clean out opening being provided in the zone of the lateral chamber 15 and serving also as a means for permitting access to the gate valve for any removal or replacement of the latter that may be desired.

The inclined bottom wall 25 of the chamber 15 is provided with an internally threaded hole 26 to provide a means for connection of the water pipe 27 which is tapped in on the service line 28 and which includes a control valve 29. When the control valve is open, water from the service line enters the fitting behind the flap valve 10 to raise the latter to closed position and, filling the waste pipe on top of any stoppage therein, will finally, by reason of the pressure supplied by the service line, dislodge the stoppage, transferring it to the sewer where it may be readily carried off.

The air chamber 23 is not an essential element of the flap valve since the latter should always be open unless there is some stoppage in the waste line which may be readily disposed of as aforesaid. However, the air chamber is a useful element in that it will automatically effect closure of the flap valve in the event of stoppage in the waste line and the accumulation of water on top thereof, so that in the event that the stoppage is at a point adjacent the chamber 15 it may not accumulate to obstruct the valve and prevent it being shifted to closed position when the flush out operation takes place.

While shown in connection with a sink, the fitting may be employed on all plumbing fixtures, such as are used in bathrooms, kitchens or what not and will thus serve as a means for effectively and quickly removing any stoppage in the soil or waste pipes.

The invention having been described, what is claimed as new and useful is:

1. A vent stack fitting comprising a tubular body having a lateral inlet intermediate its ends and a lateral chambered enlargement below the plane of the inlet, the body being interiorly formed in substantially the plane of the top of the enlargement with a valve seat, a flap valve having a pivotal mounting within and adjacent the top of the enlargement so that it may be swung into engagement with the valve seat or hang wholly within the enlargement out of obstructing position with reference to the bore of the body, the valve being formed with a watertight air chamber to insure its being engaged with the seat by a rising water level in the body, and a high pressure inlet tap in communication with the interior of the body through a wall in the enlargement behind the valve when the latter is in its pendent position.

2. A vent stack fitting comprising a tubular body having a lateral inlet intermediate its ends and a lateral chambered enlargement below the plane of the inlet, the body being interiorly formed in substantially the plane of the top of the enlargement with a valve seat, a flap valve having a pivotal mounting within and adjacent the top of the enlargement so that it may be swung into engagement with the valve seat or hang wholly within the enlargement out of obstructing position with reference to the bore of the body, the valve being formed with a watertight air chamber to insure its being engaged with the seat by a rising water level in the body, that wall of the enlargement behind the valve being parallel with the axis of the body from the top of the enlargement to an intermediate point in the height of the enlargement and thereafter inclining towards the body and merging with the wall thereof, and a high presure inlet cap communicating interiorly with the body through the inclined wall portion of the enlargement, so that a stream directed into the body through said tap will be directed diagonally upward across the bore of the body but against the valve when the latter is in its pendent position.

HIRAM HAMMOND HOUSE.